UNITED STATES PATENT OFFICE.

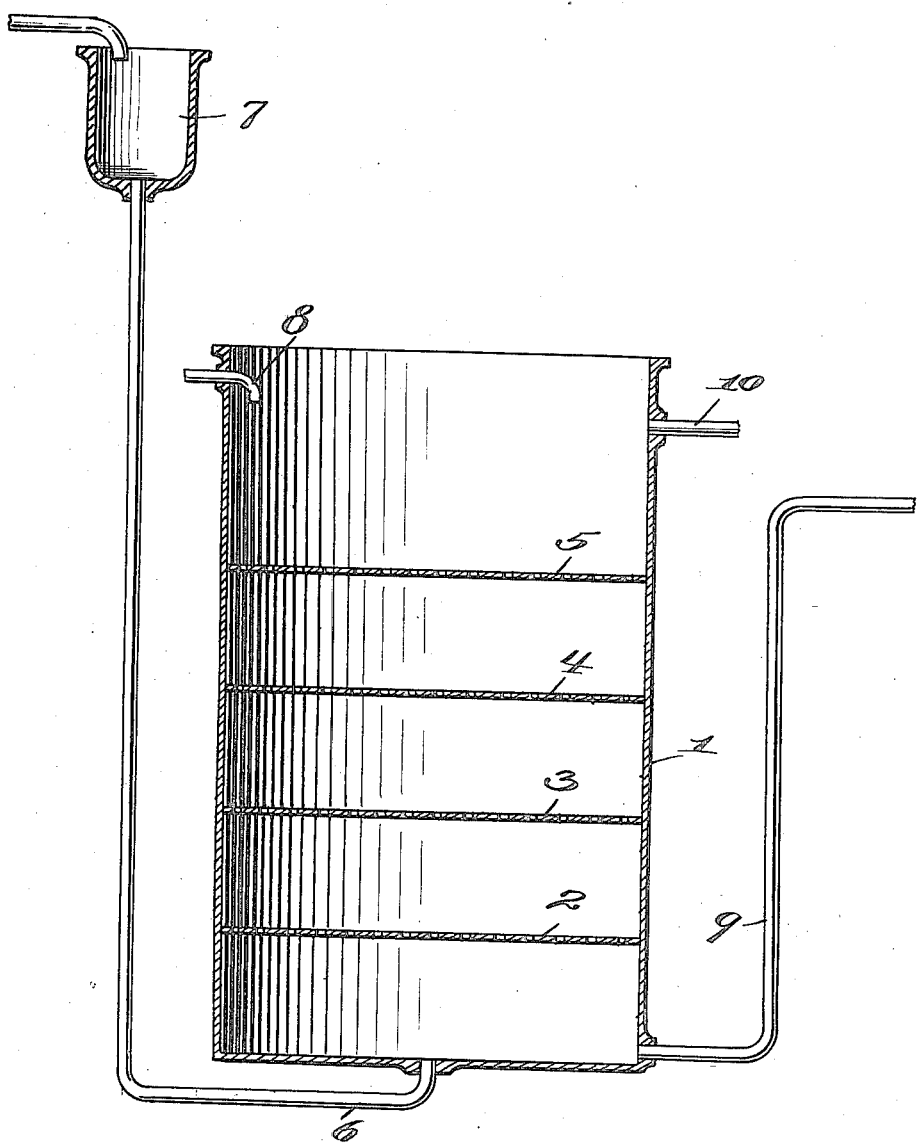

HERMAN B. KIPPER, OF MUSKEGON, MICHIGAN.

PROCESS OF PURIFYING CRUDE BENZOL.

1,253,048. Specification of Letters Patent. Patented Jan. 8, 1918.

Application filed April 27, 1917. Serial No. 164,982.

*To all whom it may concern:*

Be it known that I, HERMAN B. KIPPER, a citizen of the United States, residing at Muskegon, in the county of Muskegon and State of Michigan, have invented new and useful Improvements in Processes of Purifying Crude Benzol, of which the following is a specification.

The present invention has for its object to provide a process of removing the impurities contained in crude benzol or light oil obtained by distillation of coal tar or from coke ovens. Crude benzol or light oil so obtained contains as impurities hydrogen sulfid and carbon bisulfid. The hydrogen sulfid can be readily removed from the crude oil by washing such oil with a solution of caustic soda, but the carbon bisulfid cannot be so removed as it is not acted on by such solution.

I have discovered that, by treating the crude benzol or light oil with a caustic soda solution which contains comminuted wood, paper pulp, or other cellulose, the hydrogen sulfid is removed and the carbon bisulfid is also almost completely removed. This is explained probably by the fact that, in the manufacture of artificial silk, cellulose fiber, caustic soda and carbon bisulfid react to form the so-called "xanthates," the reaction, according to Cross and Bevan being as follows:—

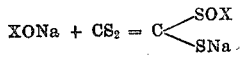

(X representing the cellulose molecule).

This reaction, I believe, takes place in my process of purifying the crude benzol or light oil.

As an aid to a description of my process, reference is made to the annexed drawing which shows an apparatus which may be used in performing the process. It is to be understood, however, that such apparatus is not essential to the process and that apparatus of various kinds may be employed if desired.

In the drawing, which represents a central vertical section through the apparatus, 1 represents a vessel of suitable size and shape and which contains the colloidal caustic soda and cellulose solution, and 2, 3, 4 and 5 represent perforated partitions or divisions which are secured to the interior of the vessel. A pipe 6 leads into the bottom of the vessel, this pipe having a funnel 7 or other receiving means for the benzol or light oil to be purified. A pipe 8 leads into the top or upper portion of the vessel and serves to introduce the caustic soda and cellulose solution therein. A pipe 9 leads upwardly from the lower portion of the vessel and serves as an outlet for the purifying solution, and an outlet 10 at or near the top of the vessel serves for the outflow of the purified benzol or light oil.

In carrying out the present invention with the aid of an apparatus such as that shown, the purifying solution composed of caustic soda and the comminuted wood, paper pulp or other cellulose, is caused to enter the top of the vessel from the pipe 8, and the impure benzol or light oil enters the bottom of the vessel from the pipe 6. Owing to the lighter specific gravity of the benzol or light oil as compared with the purifying solution, the benzol or light oil flows upwardly in the vessel while the purifying solution descends therein, and the benzol or light oil in passing upwardly through the perforated plates 2, 3, 4 and 5 is subdivided into small drops or globules, thereby facilitating the action of the purifying solution thereon. In consequence, the purifying solution rapidly absorbs the carbon bisulfid contained in the benzol or light oil.

I claim as my invention:—

1. The process of removing carbon bisulfid from crude benzol, which consists in treating the same with a solution comprising caustic soda and a cellulose.

2. The process of purifying crude benzol which comprises treating the same with a caustic soda solution containing a cellulose.

3. The process of purifying crude benzol, which comprises treating the same while in a finely divided form with caustic soda and cellulose.

4. The process of purifying crude benzol, which comprises subjecting a flowing body of the same to the action of an oppositely flowing body of caustic soda containing a cellulose.

In testimony whereof I have hereunto set my hand in presence of two subscribing witnesses.

HERMAN B. KIPPER.

Witnesses:
ALBERT M. MARS,
H. E. JONES.